United States Patent [19]

Petroff

[11] 4,115,025
[45] Sep. 19, 1978

[54] LEAD SCREW TAPPING UNIT

[76] Inventor: Robert J. Petroff, 1703 S. Main St., Lombard, Ill. 60148

[21] Appl. No.: 784,576

[22] Filed: Apr. 4, 1977

[51] Int. Cl.² .................... B23G 1/16; B23B 47/27
[52] U.S. Cl. .................................... 408/6; 408/137; 10/135 R
[58] Field of Search ............... 408/5, 6, 7, 11, 12, 408/137; 10/135 R, 135 N, 105

[56] References Cited

U.S. PATENT DOCUMENTS

| | | | |
|---|---|---|---|
| 2,165,396 | 7/1939 | Mansfield | 10/135 N |
| 3,690,782 | 9/1972 | Petroff | 408/137 |
| 3,838,934 | 10/1974 | Petroff | 408/7 |

Primary Examiner—Gil Weidenfeld
Attorney, Agent, or Firm—Fitch, Even, Tabin & Luedeka

[57] ABSTRACT

A lead screw tapping unit is disclosed wherein a tap or thread forming die is mountable on a tool support spindle which is longitudinally movable with a nonrotatable quill. The spindle is rotatably driven by a reversible drive motor and has a lead screw carried thereon which cooperates with a lead nut to effect controlled inward feeding and withdrawal of the tap relative to a workpiece. The lead nut carries a cam bushing which is operative to actuate a safety switch and deenergize a drive motor to stop rotation of the spindle should the spindle and tap undergo a thrust overload condition, or if seizure occurs between the lead screw and lead nut.

9 Claims, 6 Drawing Figures

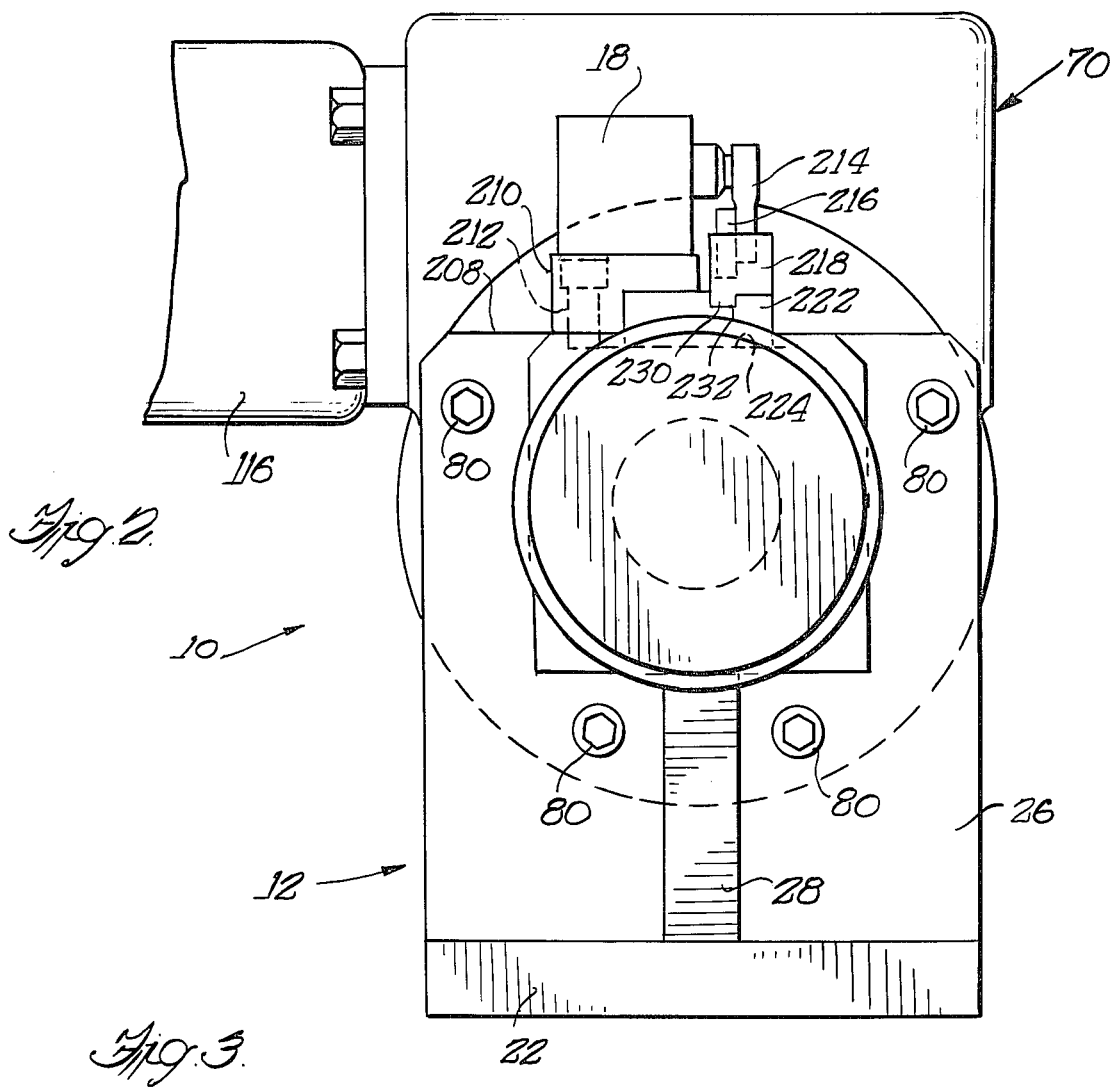
Fig. 2.
Fig. 3.
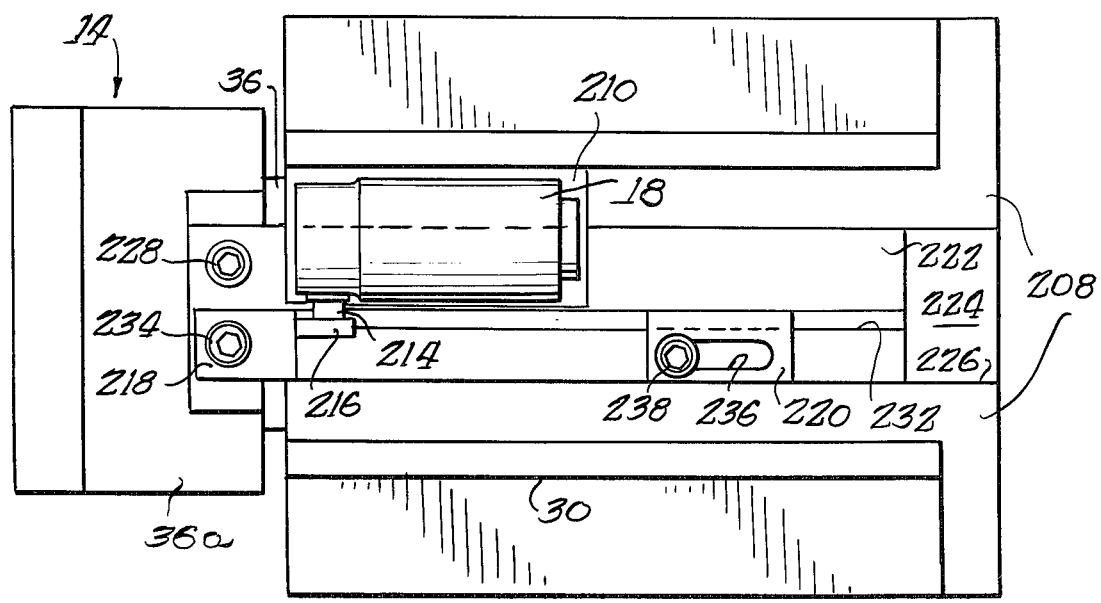

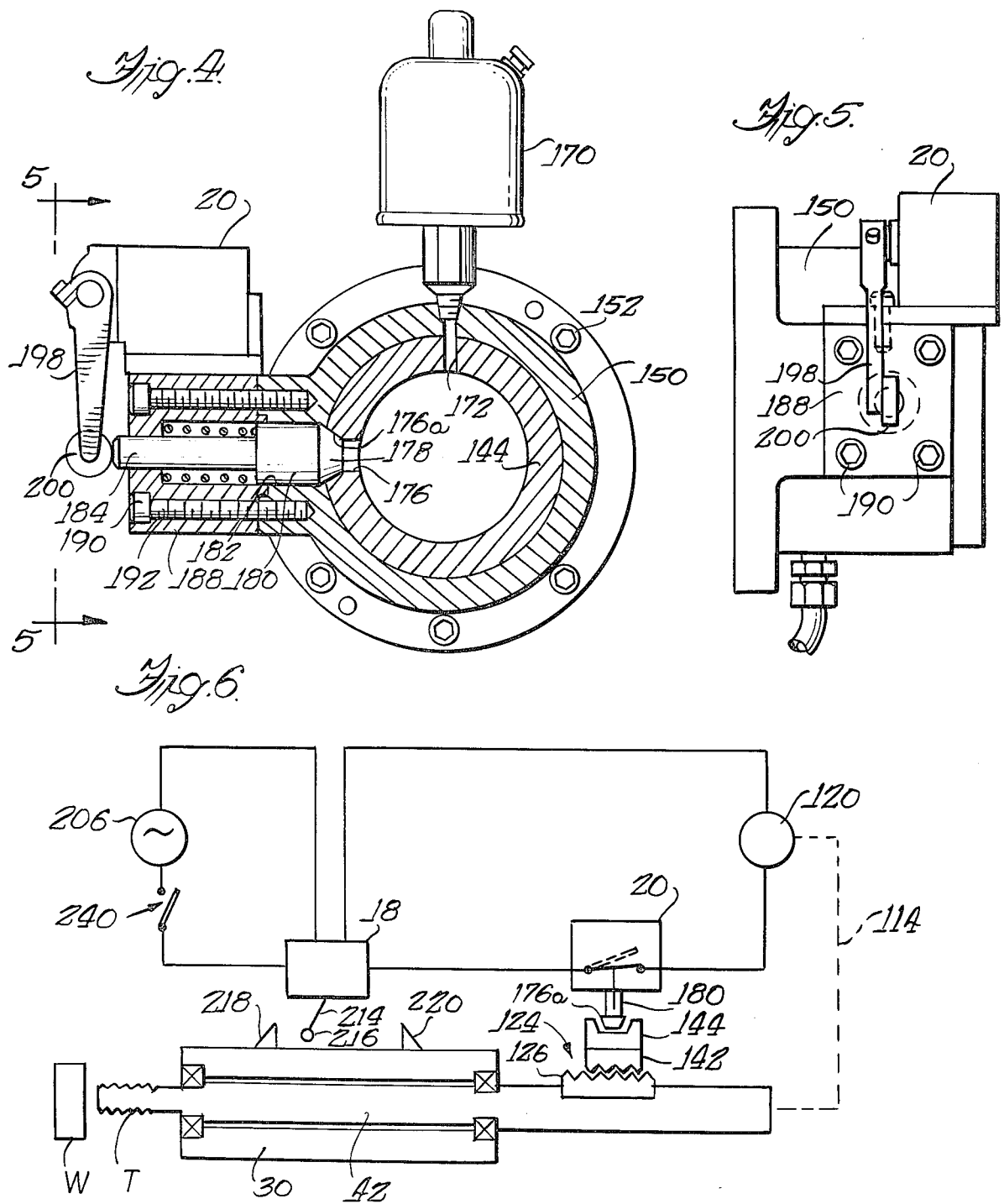

LEAD SCREW TAPPING UNIT

The present invention relates generally to machine tools, and more particularly to a lead screw tapping unit employing a rotatable spindle having a lead screw and lead nut cooperative therewith to effect controlled feeding and retraction of the spindle, and including novel safety controls to deenergize a spindle drive motor if the spindle or tap undergoes a thrust overload or if seizure occurs between the lead screw and lead nut.

Tapping units are known which feed a tap or thread forming die to a workpiece and tap a predrilled lead hole or from an external thread on the workpiece whereafter the spindle is retracted to a starting position. In one known threading apparatus, a relatively simple tap support structure is advanced by a manually controlled lever to start the tap into a lead hole where it thereafter feeds itself into the lead hole during rotation by virtue of the pitch of the male thread cutting edges. Manual feed threading apparatus provide reasonably satisfactory results with light work and very small production lots, but are highly inefficient for mass production. Advances in tapping and threading apparatus designs have introduced the use of lead screws which threadedly cooperate with lead nuts to control inward feed of a thread forming tool support spindle as the lead screw is rotated relative to the lead nut. The pitch of the thread engagement between the lead screw and lead nut is identical to the desired pitch of the thread to be formed on or in the workpiece so that a highly accurate thread may be formed with the spindle rotated at a relatively high speed. An example of a tapping apparatus employing lead screw and lead or feed nut means for high speed operation is disclosed in my U.S. Pat. No. 3,838,934, dated Oct. 1, 1974.

It has been found that in relatively heavy work, i.e., where the pitch diameter of the formed thread is to be in the order of one-half inch or more, substantial cutting forces are developed by the thread forming or cutting tools. The larger thread forming or cutting tools required for such relatively heavy work therefore necessitate substantial spindle driving torque in order to effect efficient tapping and thread forming. Because accurate and efficient thread forming also requires that the rotation of the tool support spindle be closely controlled relative to the pitch or feed of the desired thread, it has been found desirable to provide a positive non-clutched rotational drive for the tool support spindle. The positive rotational spindle drive coupled with a positive axial feed of the spindle through the lead screw and lead nut require that safety means be provided for stopping the spindle drive motor in the event that the spindle is prevented from axial feed movement or otherwise undergoes a thrust overload condition. It is also highly desirable that the safety means be capable of stopping spindle rotation should seizure occur between the lead screw and lead nut.

Accordingly, one of the primary objects of the present invention is to provide a novel improved lead screw tapping unit which finds particular application in heavy duty automatic thread forming and tapping operations.

Another object of the present invention is to provide a lead screw tapping unit having a rotary drive motor connected to a tool support spindle which carries a lead screw cooperable with a lead nut to effect controlled feeding and retraction of the spindle, and including novel control means to deenergize the drive motor if the spindle undergoes a thrust overload or if seizure occurs between the lead screw and lead nut.

A feature of the lead screw tapping unit of the present invention lies in the provision of an annular cam bushing secured to and disposed circumferentially of the lead nut, the cam bushing being axially movable in response to the spindle undergoing a thrust overload and being rotatable in response to seizure of the lead nut and lead screw, axial or rotational movement of the cam bushing serving to actuate a safety control switch operative to deenergize the spindle drive motor and prevent damage to the tapping unit.

Further objects and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 2 is a front end view of the tapping apparatus of FIG. 1;

FIG. 3 is a top plane view of the forward end of the tapping unit of FIG. 1 showing the travel limit switch and associated actuating members;

FIG. 4 is a transverse sectional view taken substantially along the line 4—4 of FIG. 1 and looking in the direction of the arrows, the safety control switch and associated actuator being shown in their preferred orientation;

FIG. 5 is a partial elevational view of the safety control switch and actuator of FIG. 4, taken along the line 5—5 of FIG. 4 and looking in the direction of the arrows; and FIG. 6 is a schematic circuit diagram of an electrical control circuit for the tapping unit of FIG. 1.

Figure 1:
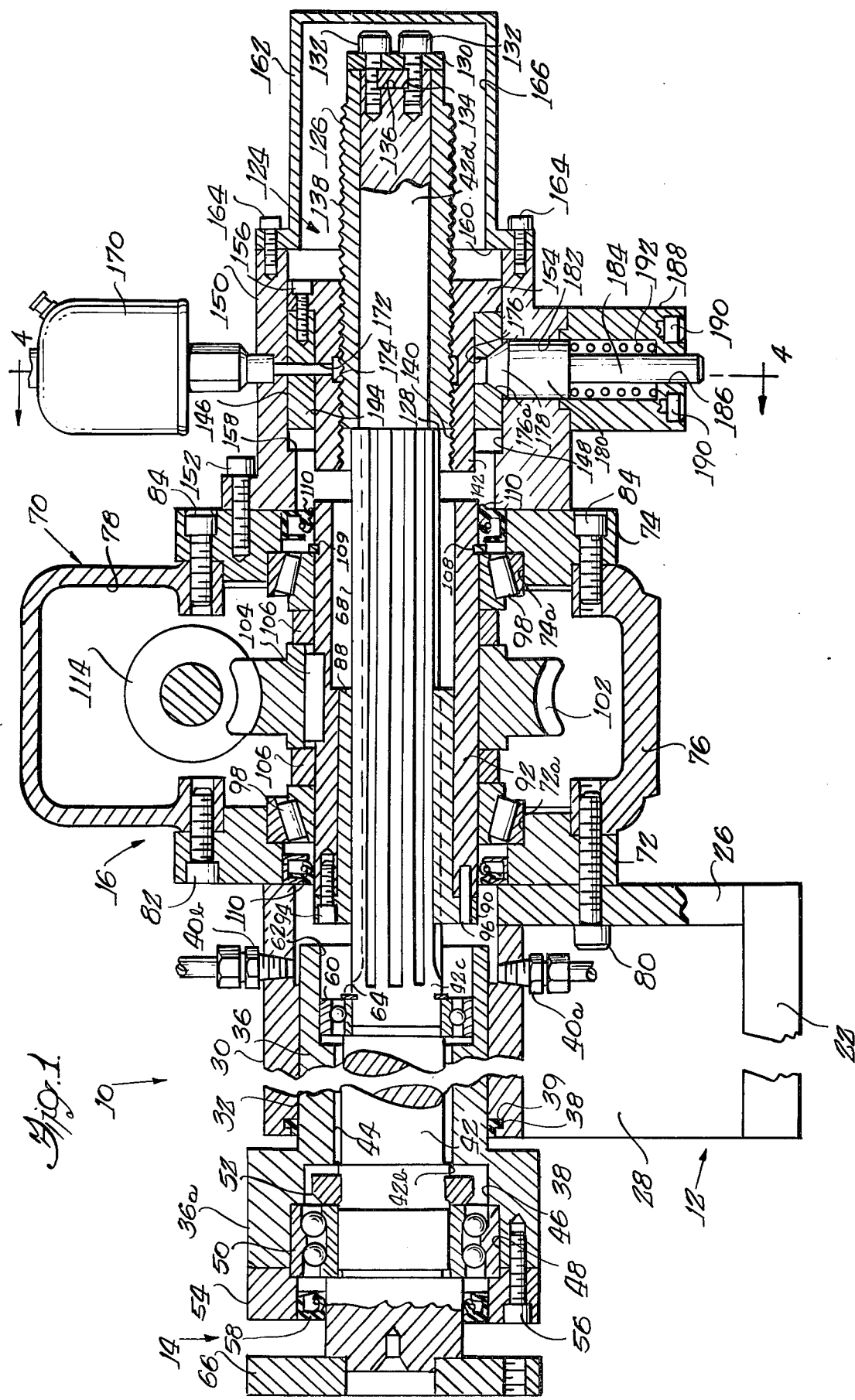
FIG. 1 is a longitudinal sectional view of a lead screw tapping unit in accordance with a preferred embodiment of the present invention, taken substantially in a vertical plane.

Referring now to the drawings, and in particular to FIG. 1, taken in conjunction with FIGS. 2 and 3, the present invention is illustrated as being embodied in a lead screw tapping unit for use in tapping internal threads or in forming external threads on workpieces and the like. The lead screw tapping unit is indicated generally at 10 and, in the hereinafter described embodiment, may be termed a lead screw tapper which may be employed in conjunction with automatic or semiautomatic tapping or thread forming operations. In the case of internal tapping, a workpiece (not shown) having a suitable predrilled lead hole therein is supported with the axis of the lead hole axially forwardly of the tapper 10 which is operative to tap the lead hole as desired. As will become more apparent hereinbelow, the structural and functional concepts to be described in connection with the lead screw tapping unit 10 may also be adapted for external thread forming.

In general, the lead screw tapper 10 includes frame or housing means, indicated generally at 12; reciprocal tool support means, indicated generally at 14, for supporting a tapping tool; reversible rotary drive means, indicated generally at 16, for effecting selective rotation of a spindle of the reciprocal tool support means 14 as will be described more fully below; and control means, including a limit switch 18 and a safety switch 20, operative to control energizing of the rotary drive means so as to effect selective reciprocal movement of the tool support means 14 during a tapping operation. The lead screw tapper 10 employs a lead screw and lead nut arrangement for effecting controlled axial feeding and retraction of the tool support means 14 so as to feed the tap into a lead hole in a workpiece, as shown schematically at "W" in FIG. 6, and thereafter retract the tapping tool to a rearward "home" position.

The housing means 12 includes a base plate 22 upon which is mounted an upstanding transverse support plate 26 and an upstanding longitudinally extending support plate 28. A quill housing 30 is mounted on the upstanding plates 26 and 28 and has a cylindrical bore 32 therethrough which, in the illustrated embodiment, defines a horizontal longitudinal axis for the lead screw tapping unit 10. The base plate 22 provides means for mounting the lead screw tapper 10 on a frame structure (not shown) or other suitable support for predetermined orientation relative to workpiece support means (not shown). While the lead screw tapper 10 is illustrated as having a horizontal axis, it will be understood that the inventive concepts underlying the lead screw tapper may also be adapted for vertically disposed apparatus.

The housing means 12 serves to support the tool support means 14 for longitudinal reciprocating movement relative to the housing means. To this end, the tool support means 12 includes a cylindrical tubular quill 36 which is axially slidably received in the bore 32 of the housing 30. A suitable annular seal 38 is received within an annular groove 39 in housing 30 adjacent the forward end of the bore 32 for sealing engagement with the associated quill 36. A pair of lubricant fittings 40a and 40b are suitably affixed within suitable tapped openings in housing 30 for communication with the interior bore therein and provide means for introducing a lubricant such as oil into the bore of the housing 30.

The quill 36 rotatably supports a cylindrical spindle 42 which forms a portion of the tool support means 14 and is longitudinally movable with the quill. For this purpose, the quill 36 has a cylindrical bore 44 which terminates at its forward end in stepped counterbore surfaces 46 and 48 formed in an enlarged forward end portion 36a of the quill. The counterbore 48 receives and supports a suitable radial thrust bearing 50 the inner race of which is affixed on the spindle 42 between an enlarged head portion 42a and a bearing nut 52 having threaded engagement with a thread surface 42b formed on the spindle. A bearing cap 54 is secured to the forward end of the spindle 42 by a plurality of screws, one of which is shown at 56, so as to secure the bearing 50 within the counterbore 48. A suitable annular seal 58 is retained within the annular bearing cap 54 for sealing engagement with the head 42a of spindle 42 to retain lubricant and prevent entry of contaminants. A radial bearing 60 supports the spindle 42 within the rearward end of quill 36 and, to this end, has its outer race received within a counterbore surface 62 in the quill and has its inner race secured on a reduced diameter portion 42c of the spindle by a snap ring 64. In this manner, the spindle 42 is rotatably supported by the quill 36 and is axially movable therewith relative to the quill housing 30. The forward end of the spindle 42 may have a tapping tool support face plate 66 secured thereto as by welding. It will be understood that the spindle 42 may have other types of tool support means thereon such as chucks or the like as are known.

The reduced diameter portion 42c of spindle 42 is splined along its length at 68, with the splined portion extending rearwardly from the quill housing 30 through a drive housing, indicated generally at 70. The drive housing 70 comprises a portion of the housing means 12 and includes a front annular end cap 72, a rear annular end cap 74 and an intermediate housing shell 76 affixed between the end caps 72 and 74 so as to define an internal drive chamber or cavity 78 therein. For mounting screws 80 extend through the transverse support plate 26 and secure the front end cap 72 and drive housing shell 76 in assembled relation to plate 26. Supplemental screws 82 also secure the end cap 72 to the housing 76 above the quill housing 30 as desired. In similar fashion, a plurality of screws 84 are employed to secure the rear end cap 74 to the housing shell 76 so that the annular end caps 72 and 74 are in axially aligned relation and coaxial with the axis of the spindle 42.

To effect driving rotation of the spindle 42, the splined portion 68 of the spindle is received through an annular spline drive 88 which has splined connection with the spindle and allows longitudinal movement of the spindle relative to the spline drive. The spline drive 88 is received within and supported by a tubular support shaft 92 to which the spline drive is secured by a plurality of screws, one of which is shown at 94, inserted through a radial flange 90 on the spline drive. Preferably, a locating dowel 96 is inserted within suitably aligned bores in the flange 90 of the spline drive and the adjacent end of the tubular support shaft 92.

The tubular support shaft 92 is rotatably supported within the drive housing 70 by a pair of identical radial thrust bearings 98 each of which has its outer race received within a suitable counterbore surface 72a and 74a, respectively, in the end caps 72 and 74. The inner races of the bearings 98 have snug engagement with the outer cylindrical surface on the tubular support shaft 92 so as to facilitate rotation of the support shaft with the spline drive 88 in splined engagement with the spline surface 68 on spindle 42.

The tubular support shaft 92 has an annular drive gear 102 supported thereon and keyed thereto through a key 104 such that driven rotation of gear 102 will effect a corresponding rotational movement of the drive spline 88. A pair of annular spacers 106 are disposed between the inner races of the bearings 98 and the drive gear 102 so as to maintain the bearings and drive gear in fixed axially spaced relation on the support shaft 92, a snap ring 108 being retained within a suitable annular groove 109 in the support shaft to maintain the bearings 98, annular spacers 106 and drive gear 102 in assembled relation on the support shaft as the rear end cap 74 is assembled onto the outer race of the right-hand bearing 98 and secured against the drive housing 76. A pair of identical annular seals 110 are suitably affixed within axial bores 72b and 74b of the end caps 72 and 74, respectively, for sealing engagement with the outer surface of the support shaft 92.

To effect driven rotation of the drive gear 102, a worm gear 114 is supported within the drive chamber 78 to engage the peripheral gear teeth on the drive gear 102 in a known manner. The axis of the worm gear 114 is normal to a vertical plane containing the longitudinal axis of the spindle 42. One end of the worm gear 114 is connected through a gear box, partially indicated at 116 in FIG. 2, to a suitable reversible electric drive motor, indicated schematically at 120 in FIG. 6, of known design. The gear reduction box 116 preferably is of the type having interchangeable pulleys and drive belts operative to obtain the desired rotational speed of the spindle 42 in either rotational direction about its longitudinal axis. The reversible electrical drive motor 120 and the associated drive components including the worm gear 114, drive gear 102, support shaft 92 and spline drive 88, comprise the rotary drive means 16 for the lead screw tapping unit 10.

As noted, the lead screw tapping unit 10 includes a lead screw and lead nut arrangement for effecting controlled axial feeding and retraction of the tool support means 14 during a tapping operation. Such lead screw and lead nut arrangement is indicated generally at 124 in FIG. 1 and includes a lead screw 126 which, in the illustrated embodiment, is tubular and is received over and supported on a reduced diameter rearward end portion 42d of spindle 42. The lead screw 126 is retained on the spindle 42 with its forward end disposed against a radial shoulder surface 128 on the spindle by an end plate or washer 130 secured to the rear end of the spindle by a pair of screws 132. A transverse key 134 of rectangular cross section is secured within a suitable transverse slot 136 in the rear end of the spindle 42 by the washer 130. The key 134 has its opposite ends received in suitably configured diametrically opposed slots in the rearward end of the lead screw 126 so as to prevent relative rotation between the lead screw and the spindle 42.

The lead screw 126 has an external right-hand thread 138 formed thereon which is received within and has threaded cooperation with a threaded axial bore 140 in an annular lead nut 142. The lead nut 142 is axially received within and supported by an annular cam bushing 144 which has an outer cylindrical surface 146 axially and rotatably slidable within a cylindrical bore 148 formed in a cam housing 150. The cam housing 150 is affixed to the rear end cap 74 of the drive housing 70 by a plurality of screws 152, as best seen in FIG. 4, such that the axis of the bore 148 is axially aligned with the axis of spindle 42. The cam bushing 144 is secured to a radial flange 154 on the lead nut 142 by a plurality of circumferentially spaced screws, one of which is indicated at 156. The cam bushing 144 and associated lead nut 142 are adapted for axial sliding within the bore 148 of the cam housing 150 between an annular shoulder surface 158, defining the inner end of bore 148, and a radial stop surface 160 formed on an end cover 162 secured to the cam housing 150 by a plurality of screws 164. The end cover 162 has an interior chamber 166 of suitable size to receive the rearward end of the spindle 42 and associated lead screw 138 during reciprocal movement of the spindle.

A lubricating oil cup 170 of known design is threadedly secured to and supported by the cam housing 150 and has a lower outlet end communicating with a passage 172 formed through the cam housing 150, cam bushing 144 and lead nut 142 so as to provide lubrication to the interfacing external thread 138 and internal thread 140 on the lead screw 126 and lead nut 142, respectively. Preferably, an annular lubricating groove or recess 174 is formed in the lead nut 142 at the innermost end of the lubricating passage 172 to assist in flow of the lubricant about the full circumferential surface of the lead screw 126. The lubricating passage 172 is formed in the lead nut 142 and cam bushing 144 so as to be in communication with the lubricating cup 170 when the cam bushing and associated lead nut are in generally intermediate positions between the stop surfaces 158 and 160 as shown in FIG. 1.

The cam bushing 144 has a radial circular opening 176 therethrough diametrically opposite the portion of the lubricating passage 172 disposed in the cam bushing, the radial outer portion of the opening 176 being defined by a frusto-conical surface 176a. The frusto-conical surface 176a is adapted for mating engagement with a frusto-conical end surface 178 on a plunger 180 which is slidingly received within a radial bore 182 formed in the cam housing 150 such that the axis of plunger 180 is axially aligned with the axis of opening 176. The plunger 180 has a reduced diameter shank portion 184 which is slidingly received through a suitable bore 186 in a plunger housing or end cap 188 secured to the cam housing 150 by a plurality of screws 190. A compression spring 192 is coaxial with the shank 184 of plunger 180 and is disposed within the plunger housing 188 so as to bias the plunger radially inwardly with its frusto-conical end surface 174 biased into engagement with the frusto-conical surface 176a of the radial opening 176. In this manner, the cam bushing 144 and associated lead nut 142 are biased to predetermined rotational and longitudinal positions relative to cam housing 150 as shown in FIGS. 1 and 4 wherein they are generally intermediate the stop surfaces 158 and 160. The spring 192 is selected such that when the cam bushing 144 and associated lead nut 142 are subjected to a predetermined axial force or a predetermined rotational torsional force, the plunger 180 will be moved radially outwardly relative to the cam housing 150.

The plunger 180 is operatively associated with the normally closed safety switch 20 so as to open the safety switch when the plunger 180 is moved radially outwardly from its position shown in FIGS. 1 and 4. To this end, the limit switch 20 is mounted on the plunger housing 188 and has a pivotal actuating arm 198 positioned such that a rotatable contact roller carried on the actuator arm is in continual engagement with the outer end of the plunger 180. In this manner, it will be seen that if the cam bushing 144 is moved axially forwardly or rearwardly relative to the cam housing 150 from its position shown in FIG. 1, or is rotated about its own axis from the position as shown in FIG. 4, the plunger 180 will be moved radially outwardly to actuate the switch actuating arm 198 which may be adapted to open switch 20 upon relatively minor axial outward movement of the plunger 180.

If desired, a keyway slot (not shown) may be formed longitudinally along the surface 148 of the cam housing 150 and a similar opposed keyway slot formed longitudinally in the outer surface 146 of cam bushing 144 so that a key bar may be inserted into the opposed slots to prevent rotation of the cam bushing relative to the cam housing. Under such an alternative design, the lead nut 142 and associated cam bushing 144 would be free to move longitudinally and open the safety switch 20 when the spindle 42 undergoes a predetermined thrust overload force. However, the cam bushing would be prevented from rotating relative to the cam housing 150 by the key bar.

Referring to the schematic circuit diagram of FIG. 6, the reversible electric drive motor 120 is diagrammatically shown as being connected in circuit with a power supply 206, such as a conventional 220 v.a.c. supply. The safety switch 20 is shown connected in series with the electric drive motor 120 such that in the normally closed position of switch 20 and with the plunger 180 suitably received within the frusto-conical recess 176a in the cam bushing 144, the drive motor 120 is adapted to be energized by the power supply 206 under the control of the aforenoted limit switch 18. With particular reference to FIGS. 2 and 3, the limit switch 18 serves as a forward and reverse control switch for the spindle 42 and quill 36 and is mounted on the housing 30 generally adjacent the forward end thereof. To this end, the housing 30 includes a horizontal flat surface 208 to which is secured a rectangular switch support bracket 210, as by screws 212. The limit switch 18 is mounted on the support bracket 210 and has a pivotal actuating arm 214. A contact roller 216 is supported on the outer end of the actuating arm 214 and is engageable by switch actuators 218 and 220 which are secured on the upper surface of a rectangularly shaped switch plate 222. The switch plate 222, which may alternatively be termed a cam bar, is secured to an upper horizontal planar surface 224 formed on the quill 36 in underlying relation to an upwardly open longitudinal guide slot 226 in the housing 30. The switch plate 222 is secured to the quill 36 as through screws, one of which is indicated at 228. The switch plate or guide bar 222 has a horizontal width slightly less than the width of the slot 226 so that the switch plate lies longitudinally within the guide slot 226 and, being secured to the quill 36, prevents rotation of the quill about its longitudinal axis relative to the housing.

The switch actuators 218 and 220 have depending legs or projections 230 thereon which are slidably received within a suitably configured longitudinally extending groove 232 in the upper surface of the switch plate 222. The switch actuators 218 and 220 are thus longitudinally slidable along the length of the switch plate 220. The forward switch actuator 218 is secured to the switch plate 222 by a screw 234 and has an actuating surface 218a thereon positioned to actuate the limit switch arm 214 when the quill 36 and spindle 42 are in a predetermined rearward position relative to the housing 30 so as to condition the switch 18 to a "forward" mode of operation for the drive motor 120. The switch actuator 220 has an elongated slot 236 therethrough which receives a screw 238 for adjustably securing the actuator 220 to the switch plate 222. The switch actuator 220 has a switch actuating surface 220a positioned to actuate the limit switch 18 when the quill 36 and spindle 42 have reached a predetermined forward axial position relative to the housing 30 so as to condition the limit switch 18 in a "reverse" mode of operation for the drive motor 120. The limit switch 18 is of known design, such as a SQUARE D model No. B64B2. A plurality of tapped holes may be longitudinally spaced along the length of the switch plate 222 to receive the mounting screw 238 and facilitate substantially any desired positioning of the switch actuator 220.

Preferably, a manually operable on-off switch, indicated generally at 240 in FIG. 6, is provided in the control circuit for the drive motor 120 to facilitate complete deenergizing of the control circuit.

In operation, with the spindle 42 and quill 36 disposed in their rearward positions as illustrated in FIG. 1, and with a tap, such as shown schematically at "T" in FIG. 6, or thread forming die secured to the tool face plate 66 on the forward end of the spindle 42, closing the on-off switch 240 will energize the drive motor 120 to effect rotational movement of the spindle 42 in a rotational direction to cause the lead screw 126 to be advanced forwardly relative to the lead nut 142 due to the threaded engagement therebetween. During such initial movement, the plunger 180 maintains the lead nut and associated cam bushing 144 in generally fixed positions relative to the cam housing 150. Under normal operation, the spindle 42 is fed forwardly during rotation by interengagement of the lead screw 126 and lead nut 142 which have thread pitches substantially equal to the thread pitch of the tap or thread forming tool supported on the face plate 66 so as to form internal or external threads on a workpiece W disposed axially forwardly of the spindle 42. When the desired forward travel is complete, the switch actuator 220 actuates limit switch 18 to reverse the drive motor 120 and retract the quill and spindle to their "home" positions.

Should the spindle 42 and associated tap undergo a thrust overload condition, such as when a blind or improperly drilled hole is encountered which prevents forward axial movement of the spindle during a thread forming operation, the lead screw 126, being continually rotated by the drive motor 120 through the worm gear 114, will cause the lead nut 142 to move axially rearwardly relative to the lead screw with a corresponding rearward movement of the cam bushing 144. Such rearward axial movement of the cam bushing 144 causes the frusto-conical cam surface 176a on the cam bushing to cam the plunger 180 radially outwardly whereupon the actuating arm 198 of the safety switch 20 is actuated to open switch 20 and deenergize the drive motor 120 before the tapping unit is damaged.

If during operation of the lead screw tapping unit 10 the lead screw 126 should seize with the lead nut 142 so as to prevent free relative threaded feeding therebetween, the lead nut 142 will rotate about its longitudinal axis due to continued rotation of the spindle and lead screw. Such rotational movement of the lead nut 142 will effect a corresponding rotational movement of the cam bushing 144 and cam the plunger 180 radially outwardly from the frusto-conical recess 176a to open the safety switch 196 and deenergize drive motor 120.

Thus, in accordance with the lead screw tapping unit of the present invention, a positive and efficient drive for a lead screw tapping unit is provided which incorporates novel safety features to prevent damage to the tapping unit should the spindle and associated tapping or thread forming tool be subjected to a predetermined thrust overload, or should the lead screw and lead nut undergo a seizure preventing free relative rotation therebetween.

While a preferred embodiment of the present invention has been illustrated and described, it will be understood by those skilled in the art that changes and modifications may be made therein without departing from the invention in its broader aspects. Various features of the invention are defined in the following claims.

What is claimed is:

1. In a lead screw tapping unit, the combination comprising housing means, a spindle supported by said housing means for longitudinal movement, said spindle being adapted to support a thread forming tool thereon for selective engagement with a workpiece, reversible rotary drive means, means connecting said drive means to said spindle for effecting rotation of said spindle upon energizing said drive means, lead nut means supported by said housing means and having a threaded bore extending longitudinally therethrough, said lead nut means being longitudinally movable relative to said housing means, biasing means supported by said housing means and operatively associated with said lead nut means to bias said lead nut means to a predetermined position relative to said housing means, lead screw means cooperative with said spindle for rotation and longitudinal movement therewith, said lead screw means being threadedly cooperative with said threaded bore in said lead nut means such that rotation of said lead screw means relative to said lead nut means effects longitudinal movement of said spindle relative to said lead nut means, and control means operatively associated with said drive means and adapted to selectively energize said drive means to advance said spindle toward a workpiece, retract said spindle from the workpiece to its initial position, and deenergize said drive means after a predetermined retract movement, said baising means being movable in response to said spindle undergoing a predetermined thrust overload, said control means including safety switch means responsive to movement of said biasing means to deenergize said drive means.

2. The combination as defined in claim 1 wherein said biasing means is also movable in response to seizure between said lead nut means and lead screw means in a manner to actuate said safety switch means and deenergize said drive means.

3. The combination as defined in claim 1 wherein said biasing means includes a cam bushing secured to said lead nut means and longitudinally movable relative to said housing means, said cam bushing having a cam surface thereon, and a plunger supported by said housing means in biased cooperation with said cam surface in a manner to bias said cam bushing to a predetermined position relative to said housing means, movement of said cam bushing relative to said housing means when said spindle is subjected to said thrust overload being operative to actuate said safety switch means and deenergize said drive means.

4. The combination of claim 3 wherein said cam bushing is disposed circumferentially of said lead nut means, said cam surface being defined by a frusto-conical surface formed in the peripheral surface of said cam bushing with the axis of said frusto-conical surface disposed radially from the longitudinal axis of said bushing, said plunger having its axis perpendicular to the longitudinal axis of said cam bushing and having an end surface cooperable with said frusto-conical cam surface such that longitudinal or rotational movement of said cam bushing relative to said plunger effects axial movement of said plunger to actuate said safety switch means.

5. The combination of claim 1 wherein said lead screw means comprises an annular lead screw secured to said spindle in coaxial relation thereon, said lead screw having a thread formed circumferentially thereof for threaded cooperation with said threaded bore in said lead nut means.

6. The combination as defined in claim 1 including a nonrotatable quill supported by said housing means for reciprocal longitudinal movement, said spindle being supported by said quill in coaxial relation therewith for longitudinal movement with said quill.

7. The combination as defined in claim 1 including a cam bar secured to said quill and movable therewith, said housing means having an elongate guide slot therein cooperative with said cam bar to prevent rotation of said quill relative to said housing means.

8. The combination of claim 7 wherein said control means includes control switch means mounted on said housing, adjacent said elongate slot, and a pair of switch operators carried by said cam bar and cooperable with said control switch means to actuate said control switch means when selected limits of axial movement of said quill and spindle are reached in forward and reverse directions.

9. In a lead screw tapping unit, the combination comprising housing means, a spindle supported by said housing means for longitudinal movement, said spindle being adapted to support a thread forming tool thereon for selective engagement with a workpiece, reversible rotary drive means, means connecting said drive means to said spindle for effecting rotation of said spindle upon energizing said drive means, lead nut means supported by said housing means and having a threaded bore extending longitudinally therethrough, said lead nut means being longitudinally movable relative to said housing means, biasing means supported by said housing means and operatively associated with said lead nut means to bias said lead nut means to a predetermined position relative to said housing means, lead screw means cooperative with said spindle for rotation and longitudinal movement therewith, said lead screw means being threadedly cooperative with said threaded bore in said lead nut means such that rotation of said lead screw means relative to said lead nut means effects longitudinal movement of said spindle relative to said lead nut means, and control means operatively associated with said drive means and adapted to selectively energize said drive means to advance said spindle toward a workpiece, retract said spindle from the workpiece to its initial position, and deenergize said drive means after a predetermined retract movement, said biasing means being movable in response to seizure between said lead nut means and lead screw means, said control means including safety switch means responsive to said movement of said biasing means to deenergize said drive means upon seizure between said lead nut means and lead screw means.

* * * * *